3,504,082
MEDICAMENT ENTERIC-COATED WITH ACETONE-SOLUBLE METHYL CELLULOSE DICARBOXYLATES
Carl J. Malm, John W. Mench, Brazelton Fulkerson, and John Emerson, Rochester, N.Y., assignors to Eastman Kodak Company, Rochester, N.Y., a corporation of New Jersey
No Drawing. Original application July 24, 1963, Ser. No. 297,205. Divided and this application May 4, 1967, Ser. No. 647,580
Int. Cl. A61j 3/06, 3/07; A61k 9/04
U.S. Cl. 424—35
3 Claims

ABSTRACT OF THE DISCLOSURE

It has been discovered that dicarboxylic acid esters of methyl cellulose (such as, for example, methyl cellulose phthalate) are valuable as enteric coatings for medicaments, wherein the coated medicament is insoluble in stomach secretions but is soluble in alkaline intestinal fluids. This application is specifically directed to medicaments coated with the valuable dicarboxylic acid esters of methyl cellulose.

This application is a division of our prior copending application Ser. No. 297,205, filed July 24, 1963, now abandoned.

This invention relates to new cellulose derivatives and to their use as entric coatings for medicaments.

Various dicarboxylic acid esters of cellulose have been described in the prior art. These materials are characterized by solubility in aqueous alkaline solutions and solubility in some organic solvents. The present invention constitutes an improvement thereover in that the products exhibit better solubility in aqueous alkali than previous dicarboxylic acid esters of cellulose esters, good solubility in a wide variety of organic solvents and excellent stability under high humidity and temperature conditions. These improved characteristics are particularly advantageous in enteric coatings for medicaments, in that these properties are especially pronounced at body temperatures.

One object of our invention is to provide cellulose esters having interesting characteristics. Another object of our invention is to provide enteric coatings for medicaments giving products which have good moisture resistance and resistance to gastric juices but of extremely good removability at a pH approaching that of the intestinal track particularly at body temperature. Other objects of our invention will appear herein.

The dicarboxylic acid esters of methylcellulose are conveniently prepared by reacting upon methylcellulose with a bath composed of glacial acetic acid, dicarboxylic acid anhydride particularly phthalic anhydride and an alkaline catalyst such as sodium acetate, potassium acetate or the like added or formed in situ. The methylcellulose used as a starting material may be that which is readily obtainable commercially such as having a methoxyl content within the range of 25–35%. It is desirable that the starting material have sufficient esterifiable hydroxyl groups that a substantial dicarboxylic acid radical content is imparted thereto.

Although the phthalates are of particular importance, anhydrides of other dicarboxylic acids may be employed in preparing cellulose esters in accordance with our invention such as succinic anhydride, hexahydrophthalic anhydride, tetrahydrophthalic anhydride, maleic anhydride and the like.

The following examples illustrate preparations and products in accordance with our invention.

EXAMPLE 1

One part of methylcellulose having a methoxyl content of approximately 28% and a viscosity of approximately 15 centipoises was dissolved in a mixture composed of 4 parts of glacial acetic acid and 1.8 parts of phthalic anhydride with continuous stirring on a steam bath. Upon completion of the solution 0.9 part of anhydrous sodium acetate was added thereto and the heating and stirring was continued. After 2 hours reaction time the product was separated from the bath by diluting with acetic acid and precipitating into acidified water. The product was washed and dried and was found to have a combined phthalyl content of 38.7%, and an intrinsic viscosity in acetone of 0.82. The dibasic acid ester of methylcellulose thus obtained was readily soluble in organic solvents for instance acetone, and was easily soluble in aqueous 1.5% sodium bicarbonate solution and in aqueous 1% ammonia.

EXAMPLE 2

The procedure described in the preceding example was repeated except that the reaction time was 5¼ hours. The product obtained contained 41.3% combined phthalyl and an intrinsic viscosity in acetone of 0.81. It exhibited the same solubility characteristics of the product as that of the preceding example.

EXAMPLE 3

The preceding example was repeated except that 1.8 parts of cis-4-cyclohexene-1,2-dicarboxylic anhydride was substituted for the phthalic anhydride. The product had a dicarboxylic acyl radical content of 47.9% and a 0.88 intrinsic viscosity in acetone. The product was readily soluble in organic solvents, for instance acetone, and was also soluble in 1.5% aqueous sodium bicarbonate solution and 1% aqueous ammonia.

EXAMPLE 4

Example 2 was repeated substituting 1.8 parts of succinic anhydride for the phthalic anhydride. The product obtained had a succinyl content of 39.9% and a 1.13 intrinsic viscosity in acetone. This product methylcellulose succinate had solubilities similar to those of the products in the preceding examples.

The cellulose esters referred to are especially adapted for providing of coatings for medicaments which coatings are substantially unaffected by stomach secretions but are disintegrated or dissolved in the intestines. In this way the medicaments may be released more slowly making for prolonged effect therefrom in the human or animal body. Enteric coated medicaments in accordance with our invention are adapted for use both in veterinary medicine and in the treatment of humans. It is desirable for best effects that the enteric coated esters have a free carboxyl content within 5–25% and preferably within 9–15% by weight although our invention is not limited thereto.

The medicaments to be coated such as in pill form can be pan coated with a solution of the esters dissolved in a suitable solvent or it may first be coated with or enclosed in gelatin or the like and then pan coated or otherwise coated with the solution of the cellulose derivative. The thickness of the coating can be controlled by varying the concentration of ester in the solvent. A plurality of immersions to form a layer of several coatings can also be used. If desired, the ester may be formed into capsules composed of separate telescoping units into which the medicament can be placed and sealed therein with solution applied at the edge of the telescoping segments. The medicament may be enclosed in gelatin capsules which may then be pan coated or otherwise coated with a solution of the cellulose derivative.

That the methylcellulose esters are superior in stability to those of cellulose acetate phthalate enteric coating material is shown by suspending 10 grams of each cellulose derivative in 190 grams of water and incubating in a closed bottle for 5 days at 130° F. At the end of this time aliquots of each liquid were titrated with standard dilute alkali which showed the following total acidity reported as free phthalic acid.

Percent free acid (as phthalic)
after 5 days at 130° F.: Percent
    Cellulose acetate phthalate _____ 8.0
    Methylcellulose phthalate _____ 3.9

A comparison of a methylcellulose dibasic acid ester with a corresponding ester but prepared from cellulose acetate instead of methylcellulose gave the following results.

Percent free acid (calculated as
phthalic) after 5 days at 130° F.: Percent
    Cellulose acetate cis-4-cyclohexene-1,2-dicarboxylate _____ 3.2
    Methylcellulose cis - 4 - cyclohexene - 1,2 - dicarboxylate _____ 0.4

Methylcellulose phthalate was compared as to effectiveness with a commercially available enteric coating material (cellulose acetate phthalate). In the case of each 400 salt tablets were coated with 100 milliliters of a 15 solution of the esters in acetone. Twenty-five tablets were removed after 25, 50 and 75 milliliters of the coating solution had been applied. The remaining 325 of the original tablets were given the 100 milliliter level of coating. Thus a total of 400 tablets coated with methylcellulose phthalate and another 400 coated with cellulose acetate phthalate were obtained. After coating, the tablets were oven cured overnight at 50° C. to completely remove solvent. The test consisted of two parts: (1) treating with 0.25% concentrated hydrochloric acid solution (gastric juice) at 100° F. followed by (2) removability of the coating with aqueous 1.5% sodium bicarbonate (simulating intestinal conditions). Twenty of the coated tablets of each coating level were placed in 100 ml. of 0.25% hydrochloric acid aqueous solution at 100° F. and were observed over a period of 6 hours. At each observation the number of intact tablets were recorded. At the end of 6 hours the hydrochloric acid solution was decanted and 2 of the tablets were given several washes with distilled water and 100 ml. of 1.5% sodium bicarbonate was added. The time required for complete solution of the salt tablets were observed. The results found were as follows:

METHYLCELLULOSE PHTHALATE COATED SALT TABLETS

| Coating level, milliliters | Number of intact tablets after— | | | | | | Time required to dissolve 2 tablets in 1.5% Sodium Bicarbonate (min.) |
|---|---|---|---|---|---|---|---|
| | 0.5 hr. | 1 hr. | 2 hr. | 3 hr. | 5 hr. | 6 hr. | |
| 25 | 20 | 20 | 13 | 13 | 6 | 3 | 15 |
| 50 | 20 | 20 | 20 | 20 | 20 | 20 | 30 |
| 75 | 20 | 20 | 20 | 20 | 20 | 20 | 30 |
| 100 | 20 | 20 | 20 | 20 | 20 | 20 | 45 |

CELLULOSE ACETATE PHTHALATE COATED SALT TABLETS

| Coating level, milliliters | Number of intact tablets after— | | | | | | Time required to dissolve 2 tablets in 1.5% Sodium Bicarbonate (min.) |
|---|---|---|---|---|---|---|---|
| | 0.5 hr. | 1 hr. | 2 hr. | 3 hr. | 5 hr. | 6 hr. | |
| 25 | 20 | 18 | 14 | 1 | 0 | 0 | (¹) |
| 50 | 20 | 17 | 15 | 12 | 8 | 6 | 60 |
| 75 | 20 | 18 | 18 | 16 | 14 | 11 | 90 |
| 100 | 20 | 18 | 18 | 18 | 18 | 18 | 90 |

¹ None left to test.

We claim:
1. A medicament surrounded by an acetone-soluble enteric film of a dicarboxylic acid ester of methyl cellulose, wherein said dicarboxylic acid is selected from the group consisting of phthalic, succinic, hexahydrophthalic, tetrahydrophthalic, maleic and cis-4-cyclohexene-1,2-dicarboxylic acids; said dicarboxylic acid ester of methyl cellulose having a free carboxyl content of from 5% to 25% and being a product of the reaction of an appropriate dicarboxylic acid anhydride with a methyl cellulose having a methoxyl content of 25–35% in a solvent in an esterification bath; the resulting coated medicament being substantially insoluble in acid stomach secretions and soluble in alkaline intestinal fluids.

2. A medicament surrounded by an acetone-soluble enteric film or layer as in claim 1, wherein said dicarboxylic acid is phthalic acid; said dicarboxylic acid ester of methyl cellulose being methyl cellulose phthalate.

3. A medicament as in claim 1, wherein said medicament coated with an acetone-soluble enteric coating of a dicarboxylic acid ester of methyl cellulose is contained in a gelatin capsule.

References Cited

UNITED STATES PATENTS 2,196,768   4/1940   Hiatt _____ 424—35
2,718,667   9/1955   Malm et al. _____ 424—35 XR S. K. ROSE, Primary Examiner U.S. Cl. X.R.
424—37

PO-1050
(5/69)

UNITED STATES PATENT OFFICE
CERTIFICATE OF CORRECTION

Patent No. 3,504,082        Dated March 31, 1970

Inventor(s) Carl J. Malm, John W. Mench, Brazelton Fulkerson, John Em

It is certified that error appears in the above-identified patent and that said Letters Patent are hereby corrected as shown below:

In the Specification

In column 3, line 34 delete "15 solution" and substitute therefor ---15% solution---.

SIGNED AND SEALED
AUG 25 1970

(SEAL)
Attest:

Edward M. Fletcher, Jr.
Attesting Officer

WILLIAM E. SCHUYLER, JR.
Commissioner of Patents